(12) United States Patent
Bauer et al.

(10) Patent No.: US 9,847,539 B2
(45) Date of Patent: Dec. 19, 2017

(54) METHOD FOR PRODUCING A HUMIDIFIER BLOCK FOR A HUMIDIFIER

(71) Applicant: Mahle International GmbH, Stuttgart (DE)

(72) Inventors: Swen-Juri Bauer, Stuttgart (DE); Ruediger Knauss, Kernen l.r. (DE); Samuel Martinez, Schorndorf (DE); Aleksandar Radlovic, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/516,380

(22) PCT Filed: Sep. 15, 2015

(86) PCT No.: PCT/EP2015/071032
§ 371 (c)(1),
(2) Date: Mar. 31, 2017

(87) PCT Pub. No.: WO2016/050499
PCT Pub. Date: Apr. 7, 2016

(65) Prior Publication Data
US 2017/0301932 A1    Oct. 19, 2017

(30) Foreign Application Priority Data
Oct. 1, 2014    (DE) .................. 10 2014 219 960

(51) Int. Cl.
*B01D 53/22*    (2006.01)
*B01D 63/02*    (2006.01)
*H01M 8/04119*    (2016.01)

(52) U.S. Cl.
CPC ........ *H01M 8/04141* (2013.01); *B01D 53/22* (2013.01); *B01D 63/02* (2013.01); *B01D 63/021* (2013.01); *H01M 8/04149* (2013.01)

(58) Field of Classification Search
CPC ...... B01D 53/22; B01D 53/268; B01D 63/02; B01D 63/021; H01M 8/04126; H01M 8/04149
(Continued)

(56) References Cited

U.S. PATENT DOCUMENTS 3,690,465 A    9/1972    McGinnis et al.
4,224,094 A    9/1980    Amicel et al.
(Continued)

FOREIGN PATENT DOCUMENTS

DE    2839937 A1    4/1980
DE    3586677 T2    3/1993
(Continued)

OTHER PUBLICATIONS

English abstract for DE-2839937.

*Primary Examiner* — Robert A Hopkins
(74) *Attorney, Agent, or Firm* — Fishman Stewart PLLC (57) ABSTRACT

A humidifier block and a method for producing a humidifier block are disclosed. The humidifier block may include a plurality of membranes each having a cavity for passing a through-flow and a jacket surrounding the cavity in a circumferential direction. The jacket may be moisture-permeable. At least one strip-shaped carrier may be fitted with the plurality of membranes, and the plurality of membranes may arranged in a longitudinal direction parallel to one another and adjacent to one another on the at least one carrier. The at least one carrier fitted with the plurality of membranes may be shaped into the humidifier block such that the plurality of membranes are arranged adjacent to one another in a transverse direction running transversely to the longitudinal direction and adjacent in a height direction running transversely to the longitudinal direction and transversely to the transverse direction.

20 Claims, 8 Drawing Sheets

(58) Field of Classification Search
USPC .................................................. 96/5; 95/52
See application file for complete search history.

(56) References Cited

U.S. PATENT DOCUMENTS

| | | |
|---|---|---|
| 4,770,778 A | 9/1988 | Yokoyama et al. |
| 4,911,846 A | 3/1990 | Akasu et al. |
| 4,940,617 A | 7/1990 | Baurmeister |
| 6,547,355 B1 | 4/2003 | Shimada et al. |
| 2010/0224548 A1 | 9/2010 | Tada et al. |
| 2011/0198287 A1 | 8/2011 | Dukes et al. |
| 2014/0134507 A1 | 5/2014 | Fasold |
| 2016/0310903 A1* | 10/2016 | Miller .................. B01D 63/021 |

FOREIGN PATENT DOCUMENTS

| | | |
|---|---|---|
| DE | 60033125 T2 | 12/2007 |
| DE | 102012022349 A1 | 5/2014 |
| EP | 1148933 A2 | 10/2001 |
| JP | 2002289229 A | 10/2002 |

\* cited by examiner

METHOD FOR PRODUCING A HUMIDIFIER BLOCK FOR A HUMIDIFIER

CROSS-REFERENCE TO RELATED APPLICATION

This application claims priority to German Patent Application No. 10 2014 219 960.3 filed on Oct. 1, 2014, and International Patent Application No. PCT/EP2015/071032, filed on Sep. 15, 2015, the contents of which are hereby incorporated by reference in their entirety.

TECHNICAL FIELD

The present invention relates to a method for producing a humidifier block for a humidifier for humidifying a gas, and such a humidifier block. The invention furthermore relates to such a humidifier with such a humidifier block.

BACKGROUND

Numerous applications require the provision of a gas. It is frequently necessary here that this gas has a certain humidity, therefore a certain proportion of water and/or other liquid. In order to make available such gases with the desired humidity, and/or to increase the humidity in the gas, humidifiers usually come into use. An example of such an application is a fuel cell system, in which a cathode gas, which is to be fed to a cathode of a fuel cell, is humidified with water or water vapour for optimizing the operation of the fuel cell system and/or to prevent damage to the fuel cell.

A corresponding humidifier is known from DE 10 2012 022 349 A1. The humidifier proposed therein has a humidifier block with a plurality of moisture-permeable membranes. The humidifier block is flowed through within the membrane by a first gas, and outside the membrane by a second gas, wherein the moisture-permeable configuration of the membranes permits a moisture exchange between the gases. For fixing the membranes in the humidifier block, a spacer is provided, which completely fills the humidifier block outside the membranes or is arranged in a layer- or tier-like manner between the membranes.

A disadvantage in such a realization of the humidifier block is, in particular, the complex production of the humidifier block. Thus, with the spacers, configured in a layer-like manner, the humidifier block must be stacked layer by layer, in order to realize the desired arrangement of the membranes in the humidifier block. Furthermore, both the filling and the layer-shaped configuration of the spacer reduces the capability of the humidifier block to be flowed through, in particular by the gas flowing outside the membrane, which leads to a correspondingly reduced exchange of moisture between the gases.

SUMMARY

The present invention is therefore concerned with the problem of indicating for a method for producing a humidifier block of the type named in the introduction and for such a humidifier block and an associated humidifier improved or at least different embodiments, which are distinguished in particular by a simple and/or favourably priced production and/or by an increased efficiency.

This problem is solved according to the invention by the subjects of the independent claim(s). Advantageous embodiments are the subject of the dependent claims.

The present invention is based on the basic idea, for producing a humidifier block, of using a quasi endless, strip-like carrier, which is fitted with membranes and is then shaped for the formation of the humidifier block. Hereby, in particular a stacking of the membranes on one another is dispensed with, and the use of corresponding spacers, which makes the production of the humidifier block quicker and/or more favourably priced. In addition, in this way the humidifier block can be produced so as to be reproducible and/or so as to be reproducible with a desired quality. Through the use of the strip-like carrier, which does not necessarily run along the entire length of the membranes, in addition a capability of the humidifier block to be flowed through outside the membranes is improved, so that the efficiency of the humidifier block is improved.

In accordance with the idea of the invention, the humidifier block has at least one such carrier and a plurality of membranes. The membranes have a cavity through which flow can pass, which is surrounded by a jacket. This means that the membranes are configured in particular in a tubular shape. Here, the jacket of the membranes is moisture-permeable for moisture exchange. For the production of the humidifier block, at least one of the carriers of the humidifier block is fitted with a plurality of membranes. The fitting of the carrier takes place here in such a way that the membranes are arranged in a longitudinal direction substantially parallel to one another and on the carrier adjacent to one another. Thereafter, the carrier with the membranes, i.e. the carrier fitted with the membranes, is shaped into the humidifier block. Here, the shaping of the carrier with the membranes into the humidifier block takes place in such a way that the membranes in the humidifier block are arranged next to each other in a transverse direction running transversely to the longitudinal direction and in a height direction running transversely to the longitudinal direction and transversely to the transverse direction.

Of course, it is also possible to compose several such humidifier blocks into a humidifier unit of a humidifier. Here, at least one such humidifier block is produced by the shaping of such a carrier, fitted with membranes, in accordance with the idea of the invention.

For realizing a desired size of the humidifier block, the carrier has a corresponding size, in particular a length running transversely to the longitudinal direction. This can be realized for example in that the carrier is cut to the desired length before the shaping. It is also conceivable, after the shaping, to separate or respectively cut the carrier on reaching a desired size of the humidifier block.

In preferred variants, the membranes are fixed to the associated carrier. Such a fixing of the membranes is realized for example in that the carrier is adhesive. This means that the membranes, on fitting of the carrier, are connected with the carrier in an adhesive manner. For this, the carrier can have a corresponding adhesive layer. The fixing of the membranes on the carrier guarantees here a predetermined position of the respective membrane within the humidifier block and/or a simplified shaping of the carrier which is fitted with the membranes.

Preferably, the at least one carrier is constructed in a strip-shaped manner. This means that the carrier can be configured as a strip. With an adhesive configuration of the carrier, the carrier can therefore be realized as an adhesive strip.

The shaping of the carrier with the membranes into the humidifier block is basically conceivable in any desired manner, in so far as the membranes are then arranged next to each other in transverse direction and in height direction.

For example, an embodiment is conceivable, in which the carrier is wound with the membranes to form a winding. The winding of the carrier with the membranes takes place here preferably parallel to the longitudinal direction. This means that the carrier together with the membranes can be rolled up transversely to the longitudinal direction, in particular in transverse direction. Here, a winding core can come into use, around which the at least one carrier, fitted with the membranes, is wound.

A further possibility for the realization of the desired arrangement of the membranes is the folding of the at least one carrier fitted with the membranes. This means in particular that the carrier with the membranes is folded in transverse direction. By a once-only folding of the carrier with the membranes, a humidifier block is produced here in which two layers of membranes are arranged transversely to the folding direction, therefore in particular in height direction.

Variants are particularly preferred here, in which the at least one carrier with the membranes is folded in an alternating manner transversely to the longitudinal direction. This means that the carrier with the membranes is folded in particular in transverse direction after respectively a first distance in one direction and a second distance in the opposite direction. Here, the respective first distance and the respective second distance can be of any desired length. Variants are preferred in which the distances are of equal length in order to achieve a uniform configuration of the humidifier block.

The folding of the carrier with the membranes takes place expediently such that a fold, occurring through the folding, is arranged in a region in which no membrane is present.

Basically, the respective carrier can be fitted with membranes in any desired manner. For example, it is conceivable to arrange all the membranes on a first carrier side of the carrier, and to then shape the carrier with the membranes into the humidifier block.

Furthermore, it is conceivable to fit the carrier with membranes on the first carrier side and on a second carrier side facing away from the first carrier side. Here, on the respective carrier side, any desired number of membranes can be applied, which are arranged respectively at any desired distance from one another. A configuration can also be considered, in which the same number of membranes is arranged on the first carrier side and on the second carrier side, wherein these are arranged in an alternating manner and/or at identical distances on the carrier sides.

As already explained, the humidifier block can have any desired number of such carriers, in so far as at least one such carrier is fitted with the membranes and is subsequently formed into the humidifier block.

In preferred variants, two carriers, spaced apart in longitudinal direction, are provided, which are fitted with the membranes. Embodiments are particularly advantageous here in which two such carriers are provided, which are equipped in such a way that they are arranged at end faces of the membranes. In this way, the respective carrier can be smaller in longitudinal direction, whereby the moisture exchange between a first gas flowing through the membranes and a second gas flowing outside the membranes is improved. Furthermore, the stability and/or the fixing of the membranes in the humidifier block is hereby improved.

Moreover, configurations are conceivable in which at least one such carrier is fitted with the membranes and subsequently at least one further carrier is arranged on the membranes. This means in particular that the membranes, before shaping into the humidifier block, are arranged at least partially between two carriers. Such a configuration also contributes to an increased stability and/or improved fixing of the membranes in the humidifier block.

It is characteristic of such a humidifier block according to the invention in particular that the carrier, fitted with the membranes, is configured continuously in particular along the folding or respectively winding.

It is, of course, conceivable here to separate at least one such carrier after the shaping of the humidifier block. The separating of the carrier can take place in particular in such a way that the carrier is interrupted along the at least one folding or respectively along the winding. Such an interruption can be realized for example by a corresponding cut of the carrier. It is conceivable, for example, to cut the carrier open in the region at least of one such fold.

Basically, the membranes can be arranged on the respective carrier side in such a way that they contact each other. However, variants are preferred in which membranes arranged next to one another are arranged spaced apart from one another. Hereby, an improved flowing around of the respective membrane by the second gas, flowing outside the membranes, is achieved, so that ultimately the moisture exchange between the first gas and the second gas is improved and the efficiency of the humidifier block or respectively of the associated humidifier is improved.

When the humidifier block is realized by a winding around a winding core, it is conceivable to configure the winding core so as to be able to be flowed through by at least one of the gases. Such a configuration can be realized for example in that the winding core has on its wall facing the winding at least one opening which is fluidically connected with a fluid inlet of the winding core. The fluid inlet of the winding core can be connected in the associated humidifier with a corresponding connection for the associated gas, so that this gas can arrive through the said connection and the fluid inlet into the winding core and through the openings into the winding, in order to flow around the membranes. A flow of this gas is advantageously influenced when the core is configured such that the associated gas which arrives into the core through the fluid inlet, can only flow through the openings out from the winding core.

To improve the stability of the humidifier block and/or to improve the handling of the humidifier block, it is conceivable to provide the humidifier block with a holder. The holder is preferably configured here in such a way that it holds the humidifier block externally. In this way, the flow of the gases in the humidifier block is not influenced by the holder or is influenced by it as little as possible.

The holder can be realized here for example in that it encompasses the humidifier block. Such an encompassing of the humidifier block is not necessarily realized around the entire humidifier block. This means that the holder may only partially encompass the humidifier block.

For further improvement of the operation of the humidifier block or respectively of the associated humidifier, it is further preferred if the holder is arranged in an adjacent manner at least partially in at least one carrier. In this way also the operation of the humidifier block or respectively of the associated humidifier is influenced as little as possible. For this, the holder can have struts which lie externally against the humidifier block and run on the carrier running externally on the humidifier block.

Basically, the carrier can be produced from any desired material, in so far as it is suitable for use in the humidifier block or respectively in the associated humidifier. The carrier can be produced here from a material which is able to store moisture. In this way, the surface of the membranes which is in contact with the carrier can also be used for moisture exchange. Furthermore, an efficiency of the humidifier block and therefore of the associated humidifier is hereby increased.

In an associated humidifier, the membranes form a first channel system which is able to be flowed through by the first gas, whilst the intermediate spaces between the membranes form a second channel system, which is separated in a gas-tight manner from the first channel system and is able to be flowed through by the second gas. It is conceivable here that the first gas is humidified by the second gas and vice versa.

For realizing the second channel system and/or for the gas-tight separation of the channel systems, the humidifier is configured accordingly.

Such a configuration can be achieved for example in that the humidifier block, if applicable together with the holder, is cast in epoxy resin, at least on a face side. Here, in particular, the face sides of the humidifier block at the end faces of which membrane openings of the membranes are arranged, are cast with epoxy resin. Excess resin is then removed and the membrane openings are exposed such that the membranes are able to be flowed through and in the region of the membrane openings a gas-tight separation of the membranes is realized. Therefore, the respective membrane can be flowed through by the associated gas, without this gas being able to arrive into the intermediate spaces between the membranes. Accordingly, a gas-tight separation of the first channel of the system from the channel system is realized.

For the gas-tight separation of the second channel system from the first channel system, furthermore a corresponding seal, in particular a foam, for instance a PU foam, can come into use.

The humidifier advantageously has a first inlet for introducing the first gas into the first channel system and therefore into the membranes, and a first outlet for directing the first gas, which is flowed through the membranes, out from the humidifier block. In addition, the humidifier has a second inlet for introducing the second gas into the humidifier block, i.e. into the second channel system, and a second outlet for directing the second gas out from the second channel system.

The channel systems and/or the inlets and the outlets can be realized here in such a way that the second gas flows along the membranes or transversely to the membranes. Variants are preferred here in which the inlets and the outlets are arranged on opposite humidifier sides of the humidifier. Hereby, a simple and/or space-saving use of the humidifier becomes possible.

It shall be understood that in addition to the method for producing the humidifier block and such a humidifier block, a humidifier with such a humidifier block belongs to the scope of this invention.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
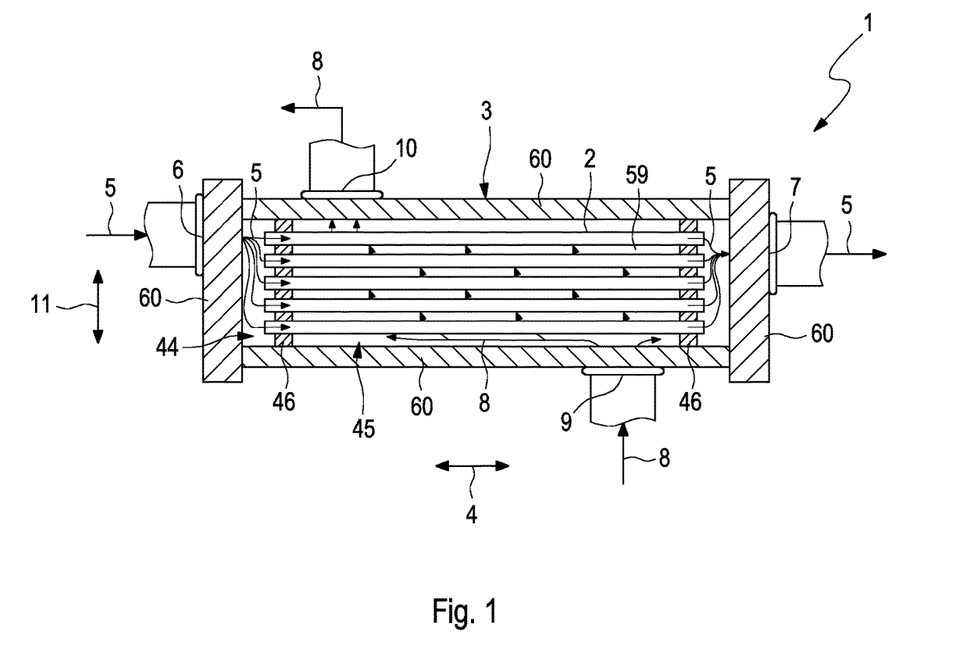
FIG. 1 is a section through a humidifier.

According to FIG. 1, a humidifier 1 has a plurality of membranes 2, which are united in a humidifier block 3. The membranes 2 are arranged in a longitudinal direction 4 parallel to one another and spaced apart from one another. The membranes 2 are able to be flowed through by a first gas 5 and are moisture-permeable. The humidifier 1 has a first inlet 6, through which the first gas 5 arrives into the humidifier 1 and into the membranes 2, which form a first channel system 44. The first gas 5, flowing through the membranes 2, flows through a first outlet 7 of the humidifier 1 out from the humidifier 1. The humidifier 1 or respectively the humidifier block 3 are, furthermore, able to be flowed through by a second gas 8, which flows around the membranes 2. This means that intermediate spaces 59 between the membranes 2 form a second channel system 45 for the second gas 8. The humidifier 1 has a second inlet 9, through which the second gas 8 arrives into the humidifier 1. The second gas 8 arrives through a second outlet 10 of the humidifier 1 out from the humidifier 1. Here, the first inlet 6 and the first outlet 7 are arranged on opposite humidifier sides 60 of the humidifier 1 along the longitudinal direction 4, whereas the second inlet 9 and the second outlet 10 are arranged on opposite humidifier sides 60 in a height direction 11 of the humidifier 1 running transversely to the longitudinal direction 4. Here, the first gas 5 flows according to the extent of the membranes 2 along the longitudinal direction 4, whereas the second gas 8 flows around the membranes 2 and therefore has a flow direction transversely to the longitudinal direction 4, in particular in height direction 11. The moisture-permeable configuration of the membranes 2 permits here a moisture exchange between the first gas 5 and the second gas 8. It is conceivable here that the first gas 5 receives moisture from the second gas 8. It is also conceivable that the second gas 8 receives moisture from the first gas 5.

Figure 2:
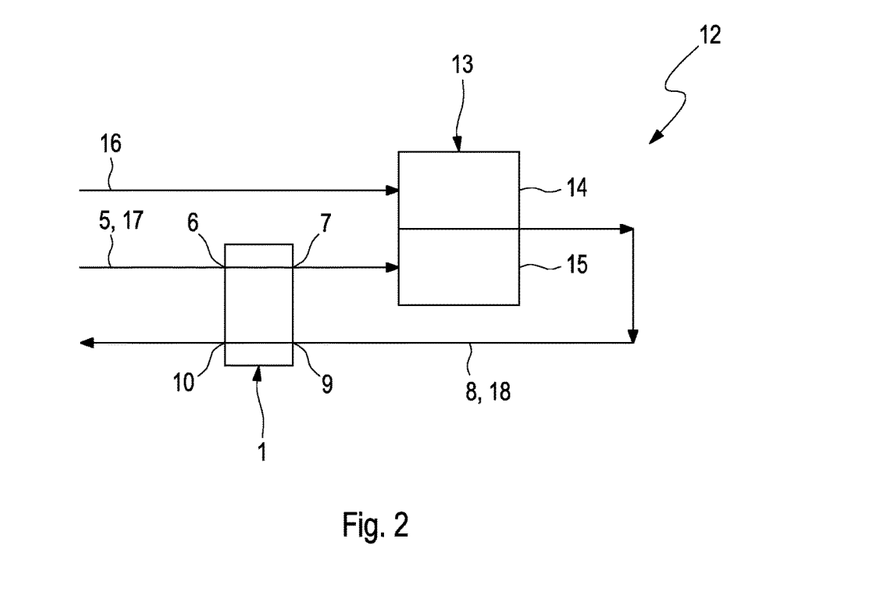
FIG. 2 is a highly simplified, circuit diagram-like illustration of a fuel cell system.

FIG. 2 shows the use of the humidifier 1 in a fuel cell system 12. The fuel cell system 12 has a fuel cell 13, which has an anode side 15 and a cathode side 15. The anode side 14 of the fuel cell 13 is supplied with an anode gas 16, whereas the cathode side 15 is supplied with a cathode gas 17. In operation of the fuel cell 13, liquid and/or gaseous water is produced, which together with a fuel cell exhaust gas 18 is discharged from the fuel cell 13. The hydrous fuel cell waste gas 18 is used, by means of the humidifier 1, to humidify the cathode gas 17. In the example which is shown, the cathode gas 17 flows as first gas 5 through the membranes 2 of the humidifier 1, whilst the fuel cell waste gas 18 flows around the membranes 2 as second gas 8. Accordingly, the fuel cell waste gas 18 delivers moisture, in the form of water or respectively water vapour, to the cathode gas 17 via the membranes 2. Hereby, damage to the fuel cell 13 is prevented and/or the operation of the fuel cell 13 is improved.

Basically, it is also possible, in the case of cathode gas 17 which is too moist, to use the humidifier 1 in reverse, quasi as a dehumidifier. Here, excess moisture is delivered from the cathode gas 17 to the less moist fuel cell waste gas 18. In this case, therefore, a transfer of moisture takes place from the first gas 5, therefore from the cathode gas 17, to the second gas 8, therefore to the fuel cell waste gas 18. Furthermore, is it conceivable to use the humidifier 1 before a reformer of the fuel cell system 12, not shown here, for generating the anode gas 16, in order to humidify a gas, for example air, which is to be fed to the reformer.

Figure 3:
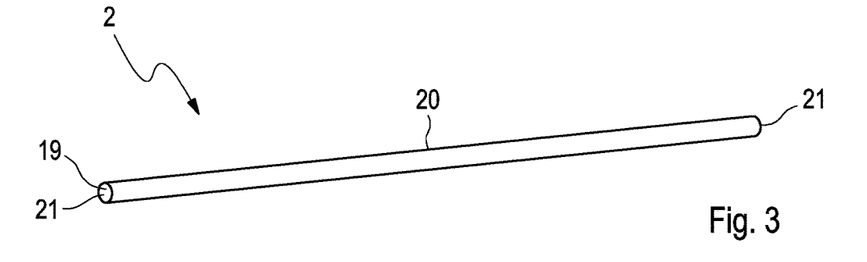
FIG. 3 is a three-dimensional illustration of a membrane.

FIG. 3 shows a three-dimensional view of such a membrane 2. The membrane 2 which is shown is configured in a tubular shape and has an elongate cavity 19, through which the associated gas 5, 8 can flow. The moisture-permeable characteristic of the membrane 2 is guaranteed by a jacket 20 of the membrane 2, surrounding the cavity 19, which jacket is moisture-permeable.

The membrane 2 has openings 21 on opposite sides, which are designated below as membrane openings 21. Through the respective membrane opening 21, the associated gas 5, 8 can flow into the membrane 2 or respectively can flow out from the membrane 2.

Figure 4:
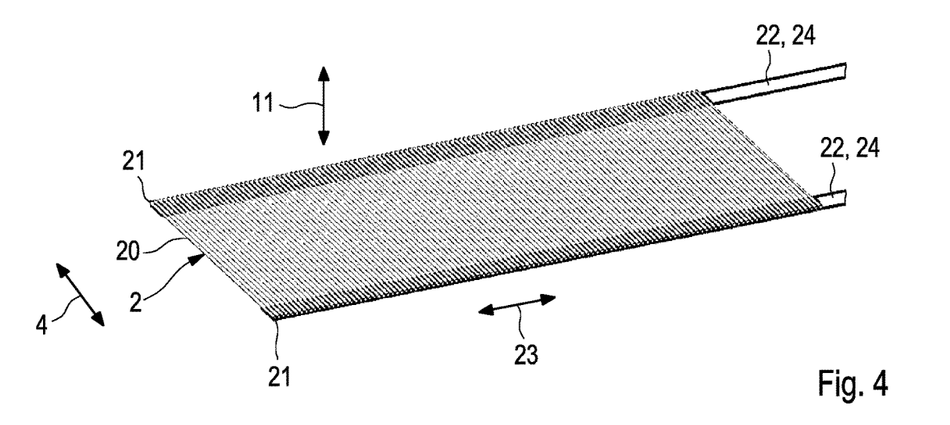
FIGS. 4 to 8 are three-dimensional illustrations during the production of a humidifier block.

As shown in FIG. 4, at least one strip-shaped carrier 22 comes into use for producing the humidifier block 3, wherein in the example which is shown, two such strip-shaped carriers 22 are used, which are arranged spaced apart in longitudinal direction 4. The carriers 22 are endless carriers 22 basically in a transverse direction 23 running transversely to the longitudinal direction 4 and transversely to the height direction 11. As can be seen in FIG. 4, the membranes 2 are arranged in longitudinal direction 4 in a parallel manner and adjacent to one another in transverse direction 23 and spaced apart from one another in transverse direction 23 on the carriers 22. Here, the carriers 22 are identical in construction and are spaced apart in longitudinal direction 4 in such a way that the membrane openings 21 in longitudinal direction 4 lie flush against the carriers 22. The carriers 22 are constructed in a strip-like manner and are configured so as to be adhesive, so that the carriers 22 can be adhesive strips 24 or carriers 22 provided with adhesive. Through the adhesive characteristic of the carriers 22, the membranes 2 are fixed on the carriers 22. In FIG. 4 it can be seen in addition that the membranes 2 are identical in construction and are arranged equidistantly in transverse direction 23.

Figure 5:
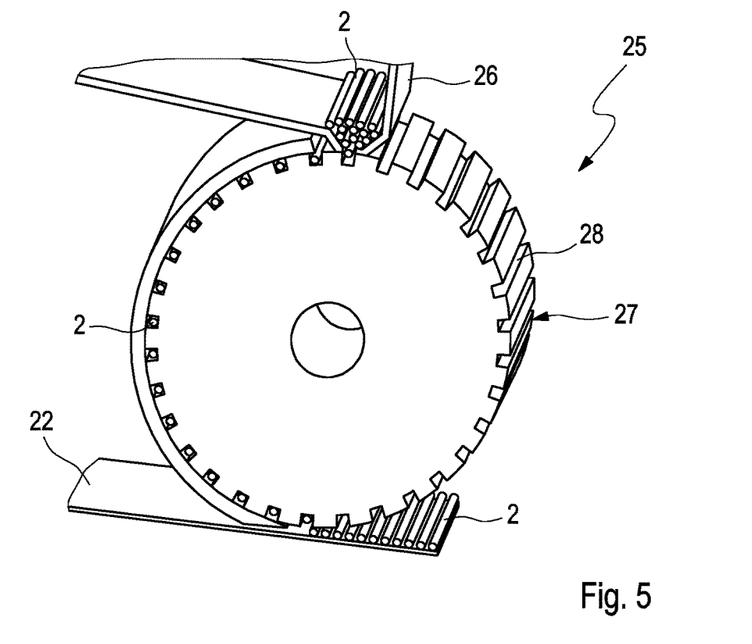

FIG. 5 shows a possibility of fitting the carriers 22 with the membranes 2. For this, a fitting device 25 comes into use, which has a membrane container 26 for storing the membranes 2 and a roller 27 for fitting the carrier 22 with membranes 2. On its outer circumference, the roller 27 has mounts 28 constructed in a complementary manner to the membranes 2, which receive membranes 2 from the membrane container 26 and, through a rolling movement of the roller 27, arrange them onto the carrier 22. The uniform, equidistant distribution of the mounts 28 leads here to a uniform equidistant arrangement of the membranes 2 onto the carrier 22.

Figure 6:
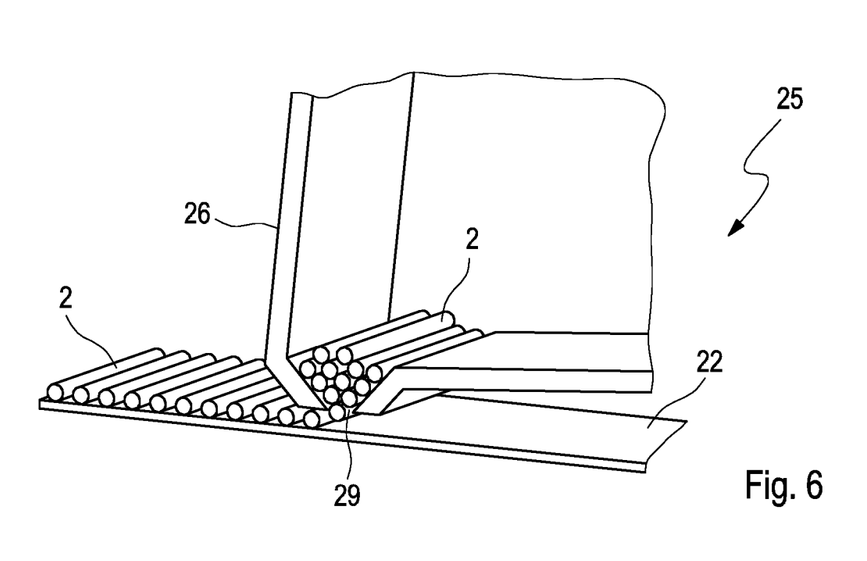

FIG. 6 shows an alternative configuration of the fitting device 26, in which the membrane container 26 has on its side facing the carrier 22 a fitting opening 29, through which membranes 2 can arrive individually from the membrane container 26. For fitting the carrier 22 with membranes 2, the membrane container 26 is guided over the carrier 22, wherein the fitting opening 29 permits an arranging of the membranes 2 onto the carrier 22. Here, the fitting opening 29 can be configured so as to be closable, so that the membranes 2 can be applied at any desired distances onto the carrier 22.

After the fitting of the carriers 22 with the membranes 2, the carriers 22, fitted with the membranes 2, are shaped in such a way that hereby the humidifier block 3 is produced, in which the membranes 2 are arranged adjacent to one another in transverse direction 23 and in height direction 11.

Figure 7:
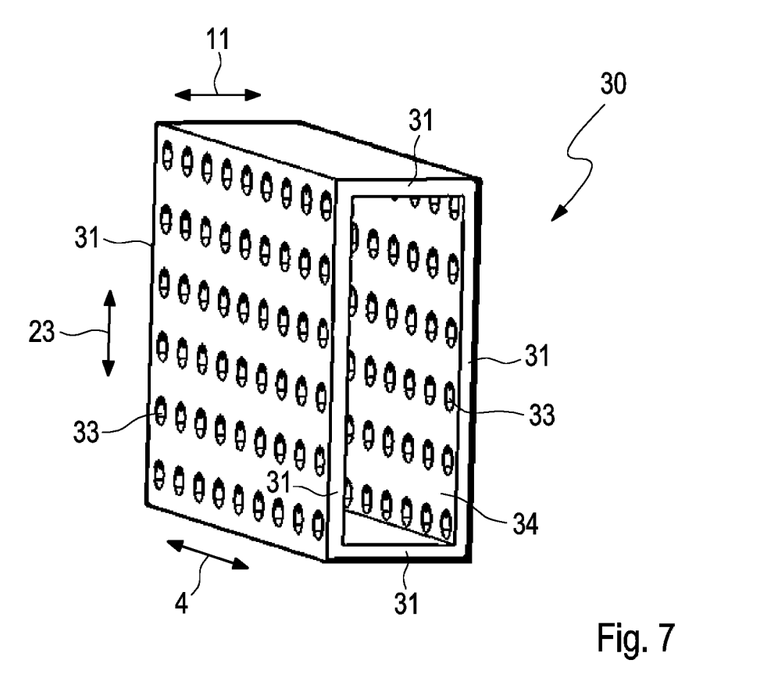
Figure 8:
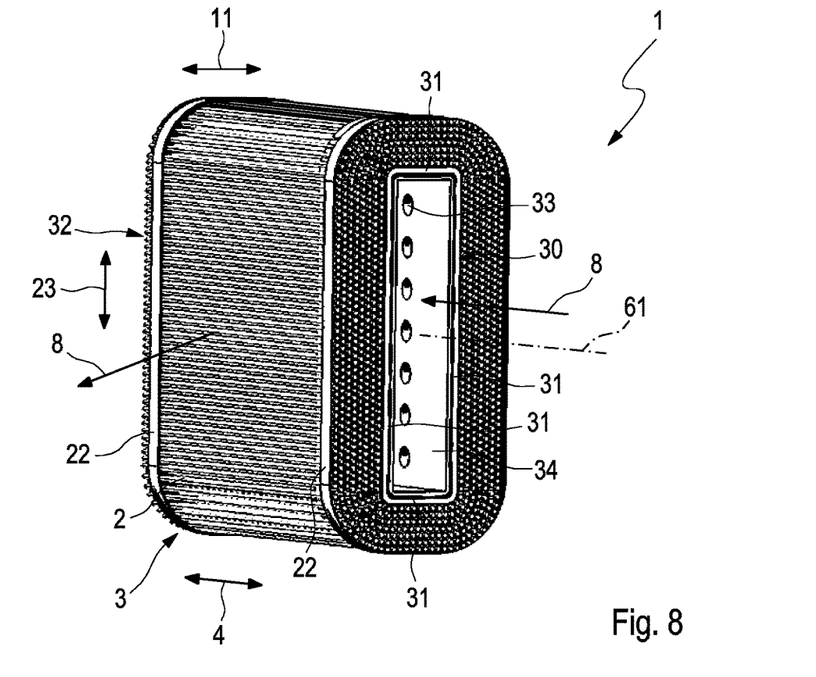

FIGS. 7 and 8 show an example for the realization of such a shaping of the carriers 22 with the membranes 2. For this, a winding core 30, shown in FIG. 7, comes into use, around which, as shown in FIG. 8, the carriers 22 with the membranes 2 are wound. The winding takes place here parallel to the longitudinal direction 4 about a winding axis 61 running parallel to the longitudinal direction 4. In the example which is shown, the carriers 22 with the membranes 2 are therefore rolled up in height direction 11 around the winding core 30. In order to achieve the desired size of the humidifier block 3, a corresponding dimensioning of the carriers 22 in transverse direction 23 is necessary. Accordingly, the carriers can be cut with the desired dimensioning before the shaping, here therefore before the winding. Alternatively, it is possible to separate or respectively cut the carriers 22 after reaching the desired size of the humidifier block 3.

As can be seen in FIG. 7, the winding core 30 has a rectangular cross-section. Here, the winding core 30 is dimensioned in longitudinal direction 4 according to the dimensioning of the membranes 2, so that the membranes 2 or respectively the humidifier block 3, after the winding around the winding core 30 in longitudinal direction 4 terminate flush against the winding core 30. In FIG. 7 it can further be seen that the winding core 30 has five wall parts 31, or abbreviated as walls 31. Here, respectively two such walls 31 lie opposite one another in transverse direction 23 and in height direction 11, whilst in longitudinal direction 4 only one such wall 31 is provided. The walls 31, lying opposite in height direction 11, which face the winding 32, have respectively a plurality of uniformly arranged core openings 33. Here, the core openings 33 are connected to the interior of the winding core 30. Through the missing wall 31 in longitudinal direction 4, the winding core 30 has a fluid inlet 34, which is fluidically connected to the core openings 33. The fluid inlet 34 can be fluidically connected here to the second inlet 9 of the humidifier 1, in order to introduce the second gas 8 through the fluid inlet 34 and the core openings 33 into the humidifier block 3, and to allow it to flow around the membranes 2, as is indicated in FIG. 8. The wall 31 of the middle core 30, lying opposite the fluid inlet 23 in longitudinal direction 4, makes provision here that the second gas 8 flows entirely through the core openings 33.

Figure 9:
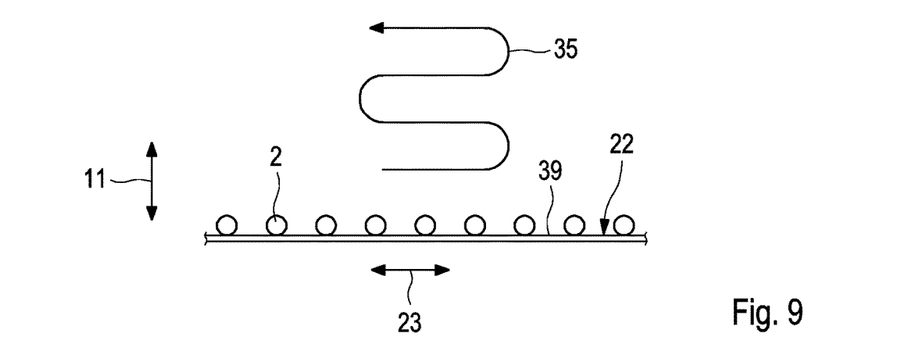
FIGS. 9 to 16 are cross-sections during different manufacturing steps of the humidifier, respectively of different embodiment.
Figure 10:
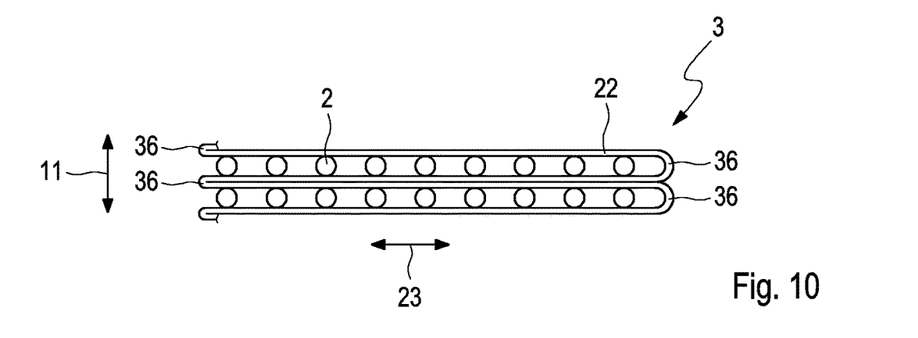

In FIGS. 9 and 10 a further example of such a shaping of the carriers 22 with the membranes 2 is illustrated. Here, FIG. 9 shows a section in transverse direction 23 through FIG. 4. It can be seen here that the membranes 2 are arranged equidistantly in transverse direction 23 on the carrier 22. The shaping of the carrier 22, fitted with the membranes 2, takes place, as indicated by a curved arrow 35, in that the carrier 22, fitted with the membranes 2, is folded in an alternating manner. In the example which is shown, the alternating folding takes place in transverse direction 23. This means that the carrier 22, fitted with the membranes 2, as indicated by the arrow 35 and shown in FIG. 10, is folded back and forth in transverse direction 23. Hereby, folds 36 of the carrier 22 arise, spaced apart in transverse direction 23, wherein the carrier 22 is folded at regular distances, so that the folds 36 have an approximately identical distance in transverse direction 23. In this way, a uniform construction of the humidifier block 3 in transverse direction 23 is achieved. The folds 36 are arranged here in a region of the carrier 22 in which no such membrane 2 is present.

Figure 11:
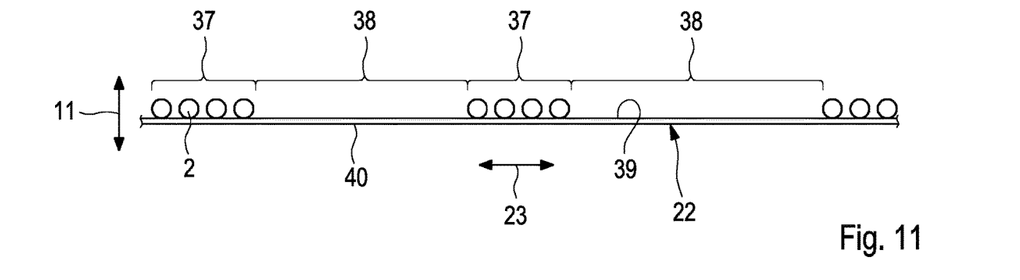
Figure 12:
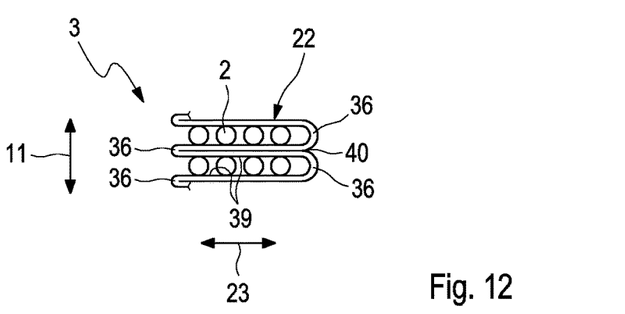

In FIGS. 11 and 12, a further example embodiment is illustrated, in which the carrier 22 is fitted with membranes 2 in transverse direction 23 only in certain regions. This means that the carrier 22 has in transverse direction 23 a first region 37, which is fitted with membranes 2, whereas an adjacent second region 38, running in transverse direction 23, is free of membranes 2. The respective first region 37 and/or the respective second region 38 can be any desired length in transverse direction 23 here. With a folding, taking place according to arrow 35, of the carrier 22 fitted with the membranes 2, the later folds 36 are arranged here in such a second region 38, wherein a humidifier 3, thus produced, is shown in FIG. 12.

In FIGS. 9 to 12, the membranes 2 are arranged on a first carrier side 39 of the respective carrier 22.

Figure 13:
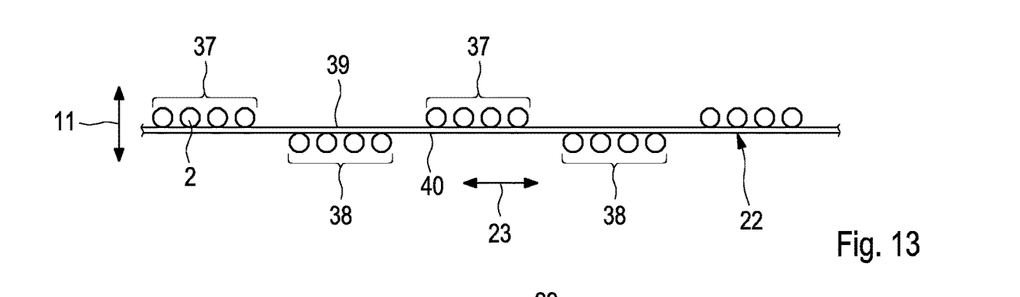
Figure 14:
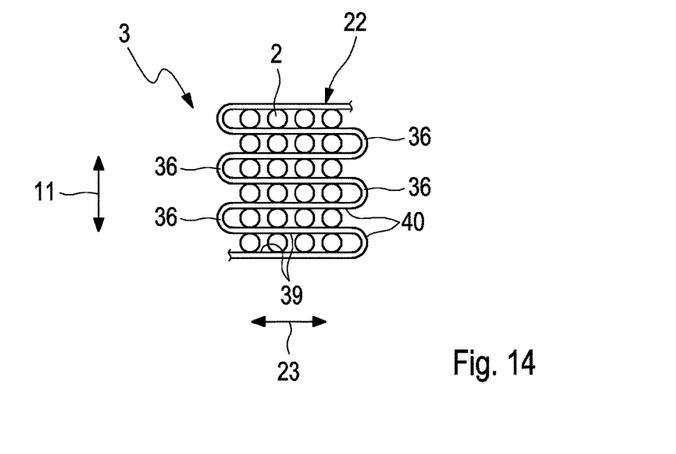

In FIGS. 13 and 14, a further variant is shown, in which both the first carrier side 39 and also a second carrier side 40 of the carrier 22, facing away from the first carrier side 39, is fitted with membranes 2. In the example shown in FIG. 13, the first carrier side 39 is fitted with membranes 2 in the first region 37, and is free of membranes 2 in the second region 38 adjacent to the first region 37. In contrast, the second carrier side 40 is free of membranes 2 in the first region 37 and is fitted with membranes in the second region 38. In the example which is shown, the respective first region 37 and the respective second region 38 are of equal length here respectively in transverse direction 23 and fitted with the same number of membranes 2. The carrier 22 fitted with the membranes 2 is folded here according to FIG. 14 in such a way that the later folds 36 are arranged between adjacent first regions 37 and second regions 38. Hereby, in particular a higher density of the number of membranes 2 is produced.

Figure 15:
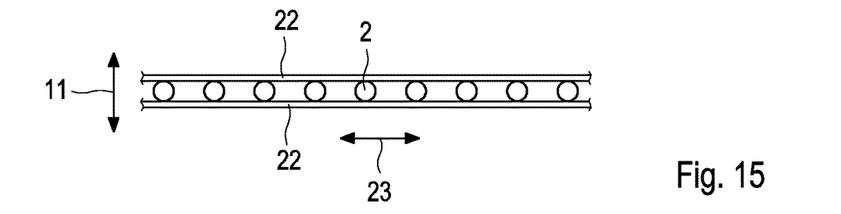
Figure 16:
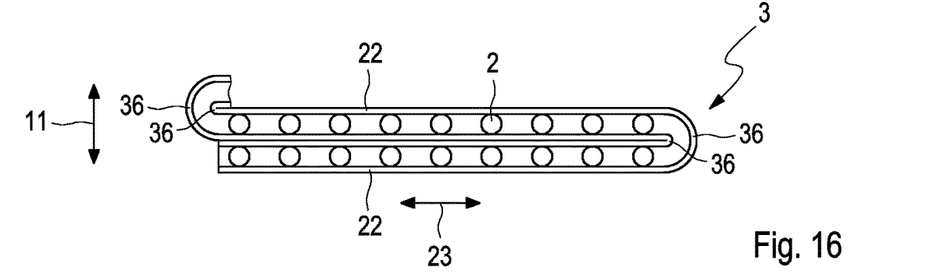

A further example is shown in FIGS. 15 and 16. It can be seen here that a further carrier 22 is arranged in height direction 11 on the membranes 2 which are arranged on the carrier 22. This means that the membranes 2 are surrounded in height direction 11 by two carriers 22 lying opposite one another. Hereby, in particular an increased stability of the membranes 2 is produced. By the folding of the carriers 22, fitted with the membranes 2, a humidifier block 3, illustrated in FIG. 16, is produced.

The respective humidifier block 3 also has membranes 2 adjacent in transverse direction 23 and in height direction 11 in the variants shown in FIGS. 9 to 16.

Figure 17:
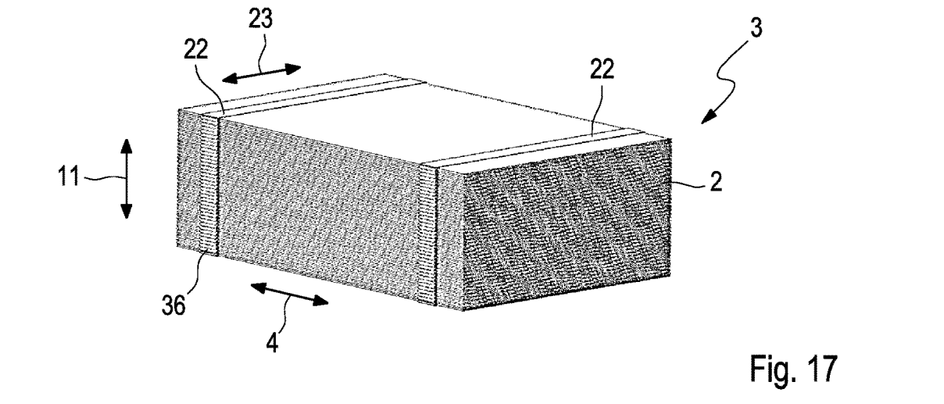
FIGS. 17 and 18 are three-dimensional views of the humidifier block.

Such a humidifier block 3, realized by folding, is illustrated in FIG. 17. The humidifier block 3 which is shown has two carriers 22, spaced apart in longitudinal direction 4, wherein the membranes 2 project over the carriers 22 in longitudinal direction 4. The humidifier block 3 has overall a cuboid-like shape and is configured larger in longitudinal direction 4 than in transverse direction 23, and larger in transverse direction 23 than in height direction 11. It would be possible here to separate the carriers 22. Such a separation could take place here in particular in the region of the exterior folds 36.

Figure 18:
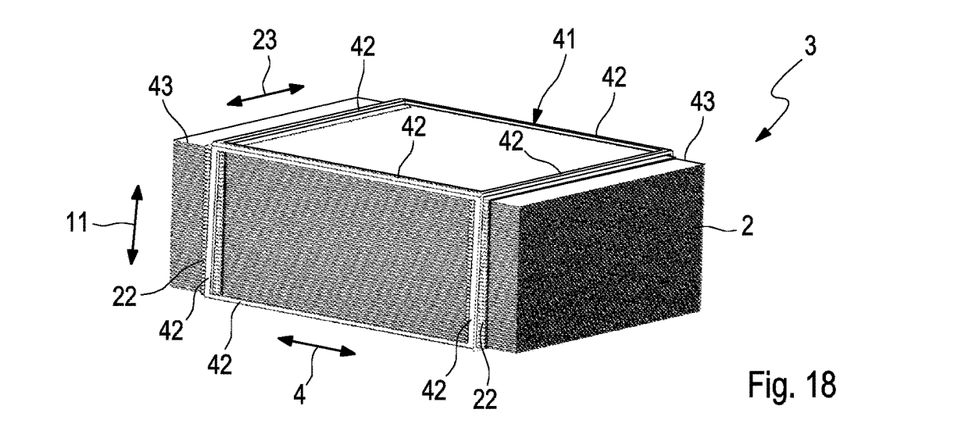

According to FIG. 18 a holder 41 is provided, which encompasses the humidifier block 3 externally and therefore stabilizes it and/or makes it more manageable. For this, the holder 41 has a plurality of struts 42, which are composed in the manner of frames arranged transversely to one another. Here, struts 42, arranged in height direction 11 and transverse direction 23, run externally on the carriers 22, whereas struts 42, running in longitudinal direction 4, run along edges 43 of the humidifier block 3 running in longitudinal direction 4.

Figure 19:
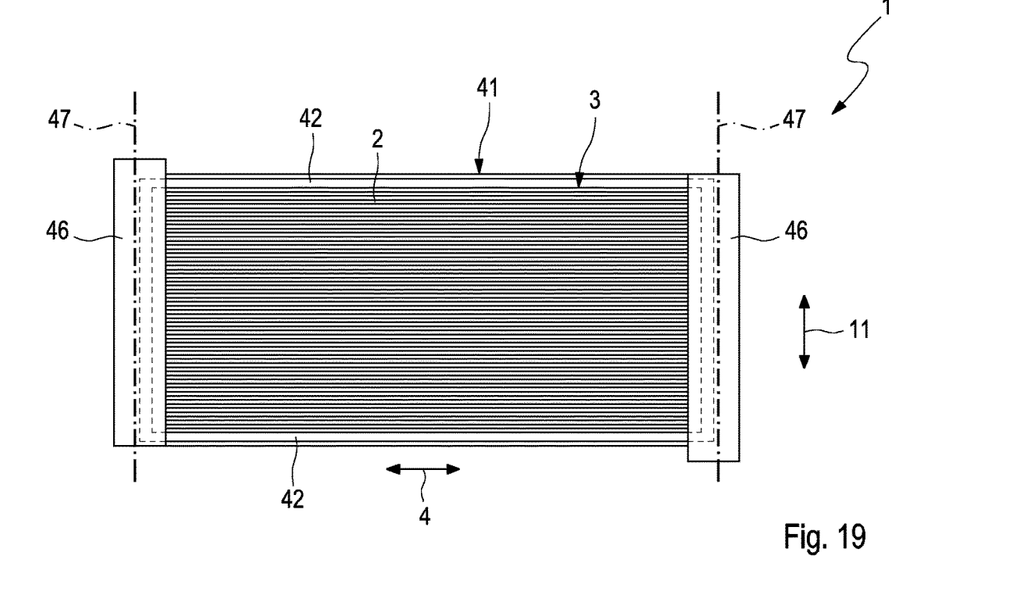
FIG. 19 is a front view of the humidifier in a further embodiment.

According to FIG. 19, an epoxy resin plate 46 is provided respectively on end faces of the humidifier block 3, lying in longitudinal direction 4, for the gas-tight separation of the first channel system 44 from the second channel system 45. The respective epoxy resin plate 46 can be realized here by the casting of epoxy resin on the holder 41. An exposing of the membrane openings 21 of the membranes 2 then takes place.

Figure 20:
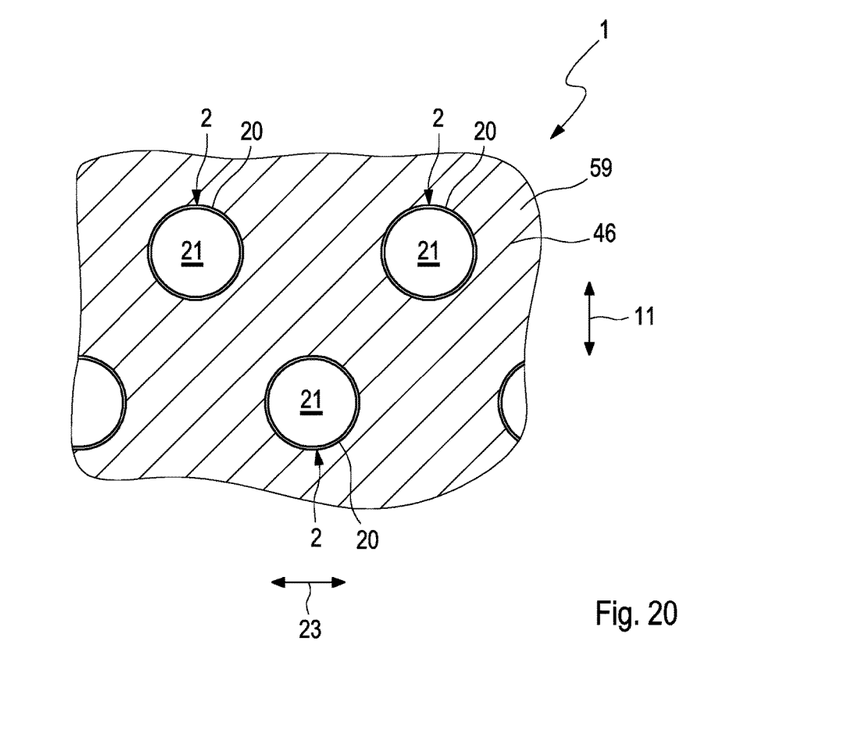
FIG. 20 is a section through FIG. 19.

FIG. 20 shows a cross-section through the humidifier 1 of FIG. 19 along one of the lines designated by 47. It can be seen here that the intermediate space 59 between the membranes 2 is filled by the epoxy resin plate 46, whereas the membrane opening 21 of the respective membrane 2 is free. Therefore, the first gas 5 can flow into the membranes 2 or respectively can flow out from the membranes 2, without it being able to arrive into the intermediate space 59 between the membranes 2. Therefore, a gas-tight separation is realized between the first channel system 44 formed by the membranes 2 and the second channel system 45 formed between the membranes 2.

Figure 21:
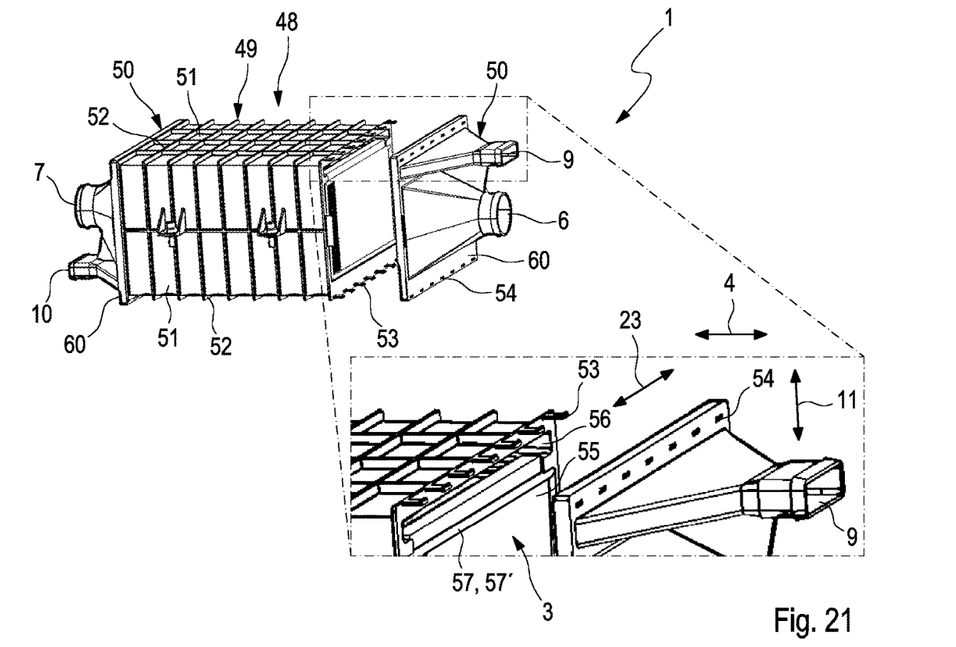
FIG. 21 is a three-dimensional view of the humidifier, of another embodiment.

In FIG. 21, such a humidifier 1 is shown, which has a housing 48 which surrounds the humidifier block 3. The housing 48 has a main section 49 and two connecting sections 50, lying opposite in longitudinal direction 4, one of which is illustrated in open state. The main section 49 has two housing halves 51, able to be connected to one another, which are arranged lying opposite in height direction 11 and are able to be connected to one another. In this way, the humidifier block 3 can be removed from the housing 48 and introduced into the housing 48 and is therefore exchangeable. The housing halves 51 have exterior ribs 52, which stabilize the housing halves 51 and, therefore, the housing 48. The main section 49 has, on its sides facing the connecting sections 50, detent structures 53 which engage in associated detent openings 54 of the connecting sections 50, in order to connect the connecting sections 50 detachably with the main section 49.

The humidifier 1 shown in FIG. 21 differs from the humidifier 1 shown in FIG. 1 in particular in that the inlets 6, 9 and the outlets 7, 10 are realized on the connecting sections 50 and therefore on humidifier sides 60 lying opposite in longitudinal direction 4. This means that the respective connecting section 50 has a fluidic connection for the first channel system 44 and a fluidic connection for the second channel system 45. In the example which is shown, the first inlet 6 and the second inlet 9 are formed on one of the connecting sections 50, and the first outlet 7 and the second outlet 10 are formed on opposite connecting section 50. In addition, the first inlet 6 and the first outlet 7 have the same shape, whilst the second inlet 9 and the second outlet 10 have the same shape, but different from the first inlet 6 and first outlet 7, in order to prevent a confusion when connecting the humidifier 1. Overall, as compact, space-saving and simple use of the humidifier 1 as possible is possible.

In order to connect the second inlet 9 and the second outlet 10 fluidically to the second channel system 45, the main section 49 has, on its sides facing the connecting sections 50, two fluid connections 55, 56, separated from one another in height direction 11, which are fluidically separated from one another. To improve the fluidic separation between the first fluidic connection 55 and the second fluidic connection 56, the fluidic connection 55 is additionally surrounded and sealed by a seal 57, in the present case in the form of a PU foam 57'. Here, the fluid connection 55, surrounded by the seal 57, is connected to the first inlet 6 or respectively to the first outlet 7, whereas the other fluidic connection 56 is connected to the second inlet 9 or respectively to the second outlet 10.

In FIG. 21 it can furthermore be seen that the second inlet 9 and the second outlet 10 are arranged on sides of the connecting sections 50 lying opposite in height direction 10. Consequently, as effective a through-flow of the humidifier block 3 as possible is achieved by the second gas 8 flowing through the second inlet 9 and the second outlet 10.

Figure 22:
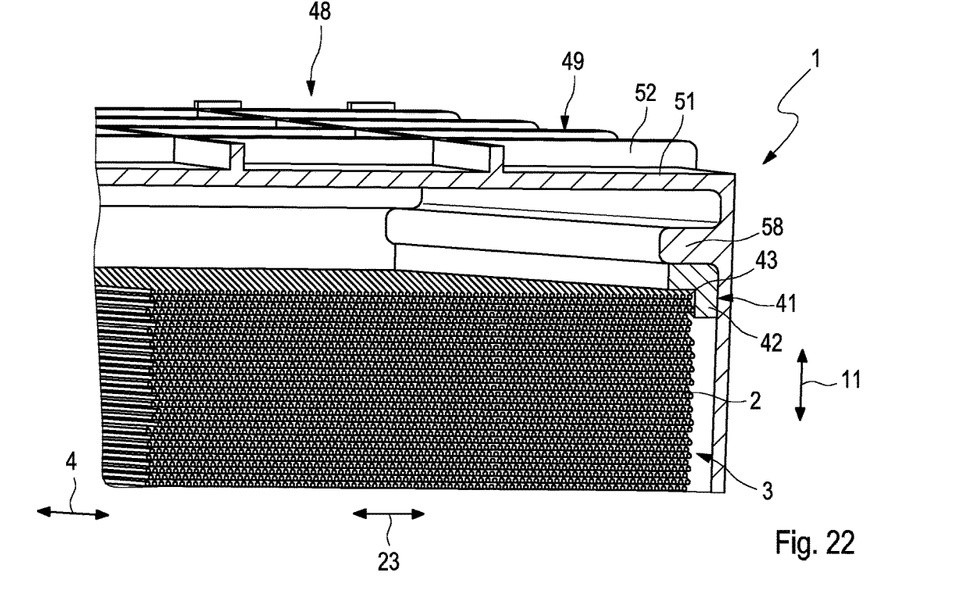
FIG. 22 is a section through the humidifier of FIG. 21.

FIG. 22 shows a section through the humidifier 1 shown in FIG. 21. It can be seen therein that the strut 42 of the holder 41, running on the edge 43 of the arrangement 3, is constructed in an L-shape, so that the strut 42 surrounds sides of the humidifier block 3, in the region of the edge 43, running in height direction 11 and transverse direction 23. In addition, the strut 42 in the housing 48 lies against, and is held in height direction 11 by a guide track 58, which runs parallel to the strut 42 in longitudinal direction 4. Consequently, an improved gas-tight separation of the first channel system 44 from the second channel system 45 is achieved.

The invention claimed is:

1. A method for producing a humidifier block for a humidifier, comprising:
   providing a plurality of membranes, the plurality of membranes each having a cavity for passing a through-flow and a jacket surrounding the cavity in a circumferential direction, wherein the jacket is moisture-permeable;
   fitting at least one strip-shaped carrier with the plurality of membranes;
   arranging the plurality of membranes in a longitudinal direction parallel to one another and adjacent to one another on the at least one carrier;
   shaping the at least one carrier fitted with the plurality of membranes into a block such that the plurality of membranes are arranged adjacent to one another in a transverse direction running transversely to the longitudinal direction and adjacent in a height direction running transversely to the longitudinal direction and transversely to the transverse direction;
   folding the at least one carrier with the plurality of membranes transversely to the longitudinal direction;
   wherein the at least one carrier has a first region in the transverse direction fitted with the plurality of membranes and an adjacent second region running in the transverse direction free of membranes, and wherein the at least one carrier is folded with a later fold arranged in the adjacent second region.

2. The method according to claim 1, further comprising fixing the plurality of membranes on the at least one carrier.

3. The method according to claim 1, wherein at least two of the plurality of membranes are arranged in an adjacent manner in the transverse direction on a carrier side of the at least one carrier.

4. The method according to claim 1, wherein the at least one carrier is fitted with at least one membrane on a first carrier side and at least one membrane on a second carrier side facing away from the first carrier side.

5. The method according to claim 1, wherein the at least one carrier includes at least two carriers fitted with the plurality of membranes and arranged spaced apart in the longitudinal direction.

6. The method according to claim 1, further comprising arranging at least one further carrier on the plurality of membranes after fitting the at least one carrier with the plurality of membranes.

7. The method according to claim 1, further comprising separating the at least one carrier fitted with the plurality of membranes after shaping the at least one carrier into the block.

8. The method according to claim 2, wherein at least two of the plurality of membranes are arranged adjacent in the transverse direction on a carrier side.

9. The method according to claim 2, wherein the at least one carrier is fitted with at least one membrane on a first carrier side and at least one other membrane on a second side facing away from the first side.

10. A humidifier block for a humidifier, comprising:
    a plurality of membranes each having a cavity for passing a through-flow and a jacket surrounding the cavity in a circumferential direction, wherein the jacket is moisture-permeable;
    at least one strip-shaped carrier fitted with the plurality of membranes, the plurality of membranes arranged in a longitudinal direction parallel to one another and adjacent to one another on the at least one carrier;
    the at least one carrier fitted with the plurality of membranes is shaped as a block such that the plurality of membranes are arranged adjacent to one another in a transverse direction running transversely to the longitudinal direction and adjacent in a height direction running transversely to the longitudinal direction and transversely to the transverse direction;
    the at least one carrier with the plurality of membranes is folded transversely to the longitudinal direction; and
    wherein the at least one carrier has a first region in the transverse direction fitted with the plurality of membranes and an adjacent second region running in the transverse direction free of membranes, and wherein the at least one carrier a fold arranged in the adjacent second region.

11. The humidifier block according to claim 10, wherein the at least one carrier includes an adhesive for fastening the plurality of membranes.

12. The humidifier block according to claim 10, wherein the plurality of membranes define a first channel system for communicating a flow of a first gas, and wherein an intermediate space between the plurality of membranes define a second channel system for communicating a flow of a second gas, the second channel system separated from the first channel system.

13. The humidifier block according to claim 10, wherein at least two of the plurality of membranes are arranged adjacent in the transverse direction on a carrier side of the at least one carrier.

14. The humidifier block according to claim 10, wherein the at least one carrier includes at least two carriers fitted with the plurality of membranes.

15. A humidifier for humidifying a gas, comprising:
a humidifier block, the humidifier block including:
   a plurality of membranes each having a cavity for passing a through-flow and a jacket surrounding the cavity in a circumferential direction, wherein the jacket is moisture-permeable;
   at least one strip-shaped carrier fitted with the plurality of membranes, the plurality of membranes arranged in a longitudinal direction parallel to one another and adjacent to one another on the at least one carrier;
   the at least one carrier fitted with the plurality of membranes is shaped as a block such that the plurality of membranes are arranged adjacent to one another in a transverse direction running transversely to the longitudinal direction and adjacent in a height direction running transversely to the longitudinal direction and transversely to the transverse direction;
   the at least one carrier with the plurality of membranes is folded transversely to the longitudinal direction; and
   wherein the at least one carrier has a first region in the transverse direction fitted with the plurality of membranes and an adjacent second region running in the transverse direction free of membranes, and wherein the at least one carrier a fold arranged in the adjacent second region.

16. The humidifier according to claim 15, the at least one carrier includes an adhesive for fastening the plurality of membranes.

17. The humidifier according to claim 15, further comprising a holder for holding the humidifier block, wherein the holder at least partially encompasses the humidifier block.

18. The humidifier according to claim 17, wherein the holder is arranged at least partially adjacent to the at least one carrier.

19. The humidifier according to claim 15, wherein:
the plurality of membranes define a first channel system for communicating a flow of a first gas; and
an intermediate space between the plurality of membranes define a second channel system separated from the first channel system in a gas-tight manner for communicating a flow of a second gas.

20. The humidifier according to claim 15, wherein at least two of the plurality of membranes are arranged adjacent in the transverse direction on a carrier side of the at least one carrier.

* * * * *